United States Patent
Fu et al.

(10) Patent No.: US 10,115,057 B2
(45) Date of Patent: Oct. 30, 2018

(54) ESTIMATING ANALYTIC EXECUTION TIMES

(71) Applicant: International Business Machines Corporation, Armonk, NY (US)

(72) Inventors: Yanjie Fu, Harrison, NJ (US); Srinivasan Parthasarathy, Yonkers, NY (US); Deepak Turaga, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 15/018,411

(22) Filed: Feb. 8, 2016

(65) Prior Publication Data

US 2017/0228650 A1    Aug. 10, 2017

(51) Int. Cl.
    *G06N 5/04* (2006.01)
    *G06N 99/00* (2010.01)

(52) U.S. Cl.
    CPC ............. *G06N 5/04* (2013.01); *G06N 99/005* (2013.01)

(58) Field of Classification Search
    CPC .................................. G06N 99/00; G06N 5/04
    See application file for complete search history.

(56) References Cited

U.S. PATENT DOCUMENTS

| | | | |
|---|---|---|---|
| 8,966,087 B2 | 2/2015 | Kan | |
| 9,058,216 B2 | 6/2015 | Frean et al. | |
| 9,715,663 B2 * | 7/2017 | Baldini Soares | .... G06N 99/005 |
| 2006/0074970 A1 * | 4/2006 | Narayanan | .......... G06F 11/3419 |

OTHER PUBLICATIONS

Ling Huang, Jinzhu Jia, Bin Yu, Byung-Gon Chun, PetrosManiatis, and Mayur Naik, "Predicting Execution Time of Computer Programs Using Sparse Polynomial Regression" NIPS Proceedings, 2010, 9 pages.*

Artem M. Chirkin and Sergey V. Kovalchuk, "Towards Better Workflow Execution Time Estimation", IERI Procedia 10, pp. 216-223.*

(Continued)

*Primary Examiner* — Eric Nilsson
(74) *Attorney, Agent, or Firm* — Cantor Colburn LLP (57) ABSTRACT

A computer program product is provided for estimating algorithm run times given parameters of the algorithm, specifications of an architecture on which the algorithm will execute and dimensions of a data set which will be input into the algorithm. The computer program product includes instructions to cause a processing circuit to create training data sets, generate run time data of executions of instances of the algorithm on the architecture for each training data set, identify model-usable features, generate a map of the model-usable features to an expression of the run time data and iteratively tuning the model-usable features toward improving map accuracy until a target map accuracy is achieved, develop a predictive model based on iteratively tuned versions of the model-usable features and estimate a run time of an execution of the algorithm on a new data set and on a new architecture using the predictive model.

17 Claims, 4 Drawing Sheets

(56) References Cited

OTHER PUBLICATIONS

Miu, T., et al. "Predicting the execution time of workflow activities based on their input features." High Performance Computing, Networking, Storage and Analysis (SCC), 2012 SC Companion:. IEEE, 2012.*

Maria Chtepen, Filip H.A. Claeys, Bart Dhoedt, Filip De Turck, Jan Fostier, Piet Demeester, and Peter A. Vanrolleghem,"Online execution time prediction for computationally intensive applications with periodic progress updates", Springer, Mar. 17, 2012, 19pgs.

Michael A. Iverson, Fusun Ozguner, and Gregory J. Follen, "Run-Time Statistical Estimation of Task Execution Times for heterogeneous Distributed Computing", IEEE Proceedings of HPDC-5, 1996, pp. 263-270.

Mohammad Alshamlan, "A Regression Approach to Execution Time Estimation for Programs Running on Multicore Systems", FIU Electronic Theses and Dissertations, Mar. 21, 2014, 80 pages.

Tudor Miu and Paolo Missier, "Predicting the Execution Time of Workflow Activities Based on Their Input Features", 2012 SC Companion: High Performance Computing, Networking Storage and Analysis, pp. 64-72.

* cited by examiner

FIG. 5

ESTIMATING ANALYTIC EXECUTION TIMES

STATEMENT REGARDING FEDERALLY SPONSORED RESEARCH OR DEVELOPMENT

This invention was made with Government support under Contract No.: H98230-14-D-0038 awarded by Department of Defense. The Government has certain rights in this invention.

BACKGROUND

The present invention relates to execution time estimate analysis and, more specifically, to execution time estimate analysis for a computing environment.

In a computing environment, it is often helpful and sometimes necessary to know ahead of time how long an execution of an algorithm will take given certain initial conditions. These initial conditions relate to a type of data being input into the algorithm, parameters of the algorithm and parameters of the architecture of the computing environment. Thus, while small data sets, logical algorithm construction and high-throughput computing architecture can provide for short execution times, increasingly complex data sets, inefficient or imperfect algorithm logic and a highly complex computing architecture can all drive higher execution times. Being able to predict how each of the conditions will ultimately affect the execution times permits operators to initiate or delay executions based on various conditions such as the available of computing resources and the priority of the executions.

Previous attempts to address the need to be able to predict execution times of algorithms have generally focused on data driven algorithms in which the features used for prediction are drawn only from the algorithms themselves. Such methods can be effective in some cases but are not always reliable in all situations.

SUMMARY

According to an embodiment of the present invention, a computer program product is provided for estimating algorithm run times given parameters of the algorithm, specifications of an architecture on which the algorithm will execute and dimensions of a data set which will be input into the algorithm. The computer program product includes a computer readable storage medium having program instructions embodied therewith. The program instructions are readable and executable by a processing circuit to cause the processing circuit to create training data sets, generate run time data associated with respective executions of parameterized instances of the algorithm on the architecture for each of the training data sets, identify model-usable features from factorized polynomial expansions of the dimensions of the data set, the parameters of the algorithm and the specifications of the architecture, generate a map of the model-usable features to an expression of the run time data, iteratively tune the model-usable features toward improving an accuracy of the map until a target accuracy is achieved, develop a predictive model based on iteratively tuned versions of the model-usable features and estimate a run time of an execution of the algorithm on a new data set and on a new architecture using the predictive model.

According to another embodiment of the present invention, a computing system is provided for estimating algorithm run times given parameters of the algorithm, specifications of an architecture on which the algorithm will execute and dimensions of a data set which will be input into the algorithm. The computing system includes a computer readable storage medium having instructions stored thereon that are executable by a processing circuit to cause the processing circuit to create training data sets, generate run time data associated with respective executions of parameterized instances of the algorithm on the architecture for each of the training data sets, identify model-usable features from factorized polynomial expansions of the dimensions of the data set, the parameters of the algorithm and the specifications of the architecture, generate a map of the model-usable features to an expression of the run time data, iteratively tune the model-usable features toward improving an accuracy of the map until a target accuracy is achieved, develop a predictive model based on iteratively tuned versions of the model-usable features and estimate a run time of an execution of the algorithm on a new data set and on a new architecture using the predictive model.

According to yet another embodiment of the present invention, a computer-implemented method is provided for estimating algorithm run times given parameters of the algorithm, specifications of an architecture on which the algorithm will execute and dimensions of a data set which will be input into the algorithm. The computer-implemented method includes creating training data sets, generating run time data associated with respective executions of parameterized instances of the algorithm on the architecture for each of the training data sets, identifying model-usable features from factorized polynomial expansions of the dimensions of the data set, the parameters of the algorithm and the specifications of the architecture, generating a map of the model-usable features to an expression of the run time data, iteratively tuning the model-usable features toward improving an accuracy of the map until a target accuracy is achieved, developing a predictive model based on iteratively tuned versions of the model-usable features and estimating a run time of an execution of the algorithm on a new data set and on a new architecture using the predictive model.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a computer program product, a computing system and a computer-implemented method are provided for accurately estimating execution times of analytics based on characteristics of input data for a given algorithm. A core principle of the computer program product, the computing system and the computer-implemented method is that features can be derived from data, an algorithm and a computing architecture in order to develop a model of algorithm execution times. This model can then be applied to new data sets.

Figure 1:
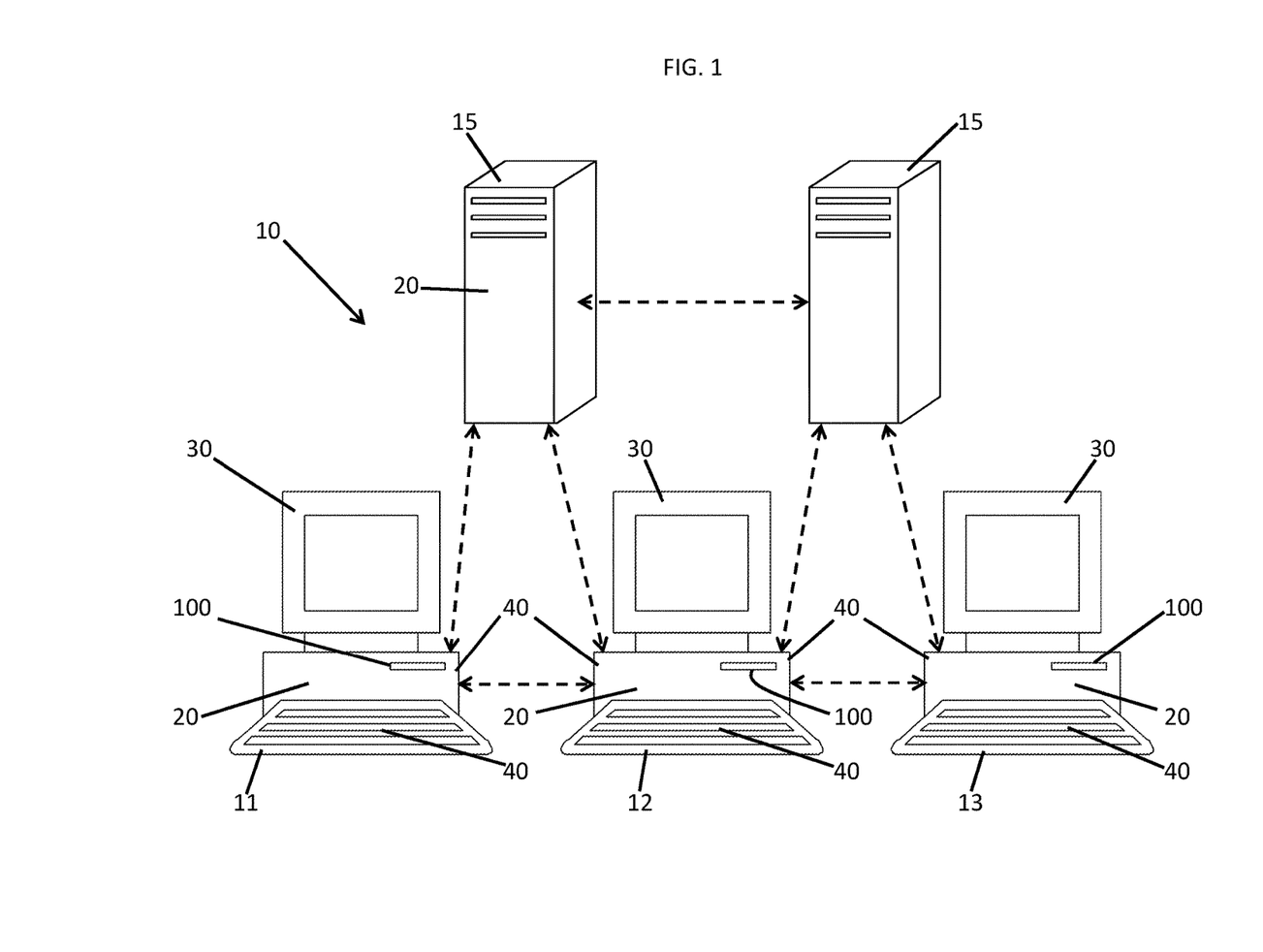
FIG. 1 is a schematic illustration of a computing system in accordance with embodiments.

With reference to FIG. 1, a computing system 10 is provided and may be configured for example as an enterprise computing system or as a personal computing system. In either case, the first computing system 10 includes first, second and third computing devices 11, 12 and 13 and servers 15 which are configured to be networked together for communication purposes. Each of the first, second and third computing devices 11, 12 and 13 and the servers 15 may include among other features a processing circuit 20, a display 30, user input devices 40 and a networking unit. Each of the first, second and third computing devices 11, 12 and 13 may further include a memory with a computer program product 100 for estimating algorithm run times given parameters of the algorithm, specifications of an architecture on which the algorithm will execute and dimensions of a data set which will be input into the algorithm. The processing circuit 20 may be provided as a micro-processor, a central processing unit (CPU) or any other suitable processing device. The display 30 may be provided as a monitor and is configured to display data and information as well as a graphical user interface to an administrator or user. The user input devices 40 may be provided as a mouse and a keyboard combination and are configured to allow the administrator or user to input commands to the processing circuit 20. The networking unit may be provided as an Ethernet or other suitable networking device by which the first, second and third computing devices 11, 12 and 13 and servers 15 are communicative.

Figure 2:
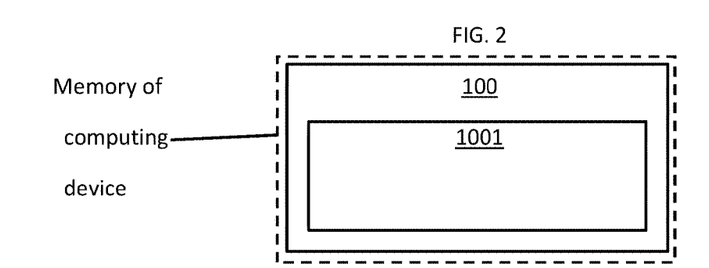
FIG. 2 is a schematic drawing of a computer program product in accordance with embodiments.

With reference to FIG. 2, the computer program product 100 includes a computer readable storage medium 1001 and may be installed in the memory of the first, second and third computing devices 11, 12 and 13 as firmware or as lower level executable program instructions. The computer program product 100 provides for an estimate of algorithm run times given parameters of the algorithm, specifications of an architecture on which the algorithm will execute and dimensions of a data set which will be input into the algorithm and includes program instructions that are readable and executable by the processing circuit 20 of any of the first, second and third computing devices 11, 12 and 13 (hereinafter referred to as the processing circuit 20 of the first computing device 11 for purposes of clarity and brevity).

Figure 3:
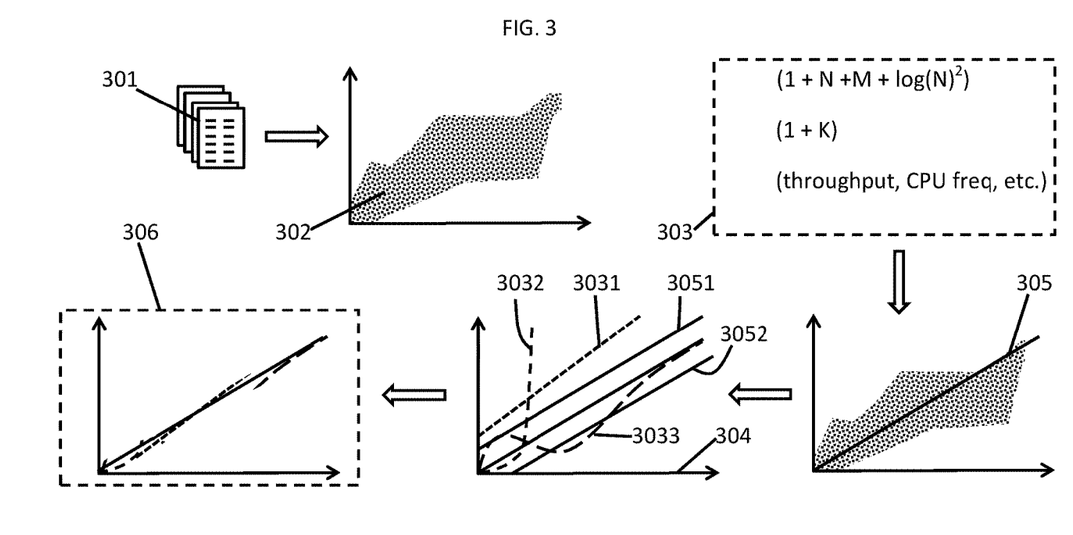
FIG. 3 is a flow diagram illustrating an operation of the computer program product of FIG. 2

With reference to FIG. 3, when they are read and executed by the processing circuit 20, the program instructions cause the processing circuit 20 to create training data sets 301, to generate run time data 302 that is associated with respective executions of parameterized instances of the algorithm on the architecture for each of the training data sets 301 and to identify model-usable features 303 from factorized polynomial expansions of the dimensions of the data set, the parameters of the algorithm and the specifications of the architecture. In addition, when they are read and executed by the processing circuit 20, the program instructions cause the processing circuit 20 to generate a map 304 of the model-usable features 303 to an expression 305 of the run time data 302, which may be calculated from any type of regression analysis or another similar type of analysis, and to iteratively automatically or manually tune the model-usable features 303 toward improving an accuracy of the map 304 until a target accuracy or a predefined range of target accuracies is achieved. Lastly, when they are read and executed by the processing circuit 20, the program instructions cause the processing circuit 20 to develop a predictive model 306 based on iteratively tuned versions of the model-usable features 303, which are associated with the achieved target accuracy, and to estimate a run time of an execution of the algorithm on a new data set and possibly on a new architecture using the predictive model.

In accordance with embodiments, the training data sets 301 may be provided as databases that are arranged in at least M rows by N columns or in any other suitable format with the parameterized instances of the algorithm having been generated from one or more variables and the specifications of the architecture including various components. The training data sets 301 may be arranged discretely and/or separated by uniform variations along each dimension (e.g., each training data set 301 is provided as an M×N database where M and N jointly and individually increase by a predefined value). In an exemplary case, the components of the specification of the architecture may include values representative of disk throughput data, values representative of central processing unit (CPU) frequency data, an inversion of available random access memory data values and values representative of memory bandwidth data.

Thus, for a given algorithm with a predefined parameter (e.g., 1+K, where K is generally variable but constant for the given algorithm) and a given architecture of first computing device 11, the processing circuit 20 will generate a plurality of the training data sets 301 of varying dimensions. These dimensions may be provided as M rows by N columns but it is to be understood that additional dimensions may be added as well. Once the training data sets 301 are created, the processing circuit 20 will execute the algorithm in sets of operations from which the run time data 302 and ultimately the expression 305 of the run time data can be derived. The processing circuit 20 will then generate the map 304 of the model-usable features 303 to the expression 305 of the run time data 302 so that the accuracy of the map 304 can be evaluated.

In accordance with embodiments, the map 304 may be constructed in a piecewise manner. That is, since the model-usable features 303 are identified from factorized polynomial expansions of the dimensions of the data set, the parameters of the algorithm and the specifications of the architecture, it is possible that the model-usable features 303 will map to the expression 305 differently in different regions of the map 304. In such cases, all of the model-usable features 303 may be employed for a first region of the map 304, only a portion of the model-usable features 303 may be employed for a second region of the map 304 and another portion of the model-usable features 303 may be employed for a third region of the map 304. In any case, the model-usable features 303 may be automatically tunable by the processing circuit 20 or manually tunable by an operator of the first computing device 11.

In a simple case, it may be assumed that the generation of the run time data 302 lead to the ultimate generation of a linear form of expression 305 and that the target accuracy of the map 304 is within upper and lower range lines 3051 and 3052. In this case, it may be further assumed that the combined model-usable features 303 form a first map line 3031, that the model-usable features 303 relating only to the parameterized instances of the algorithm forma second map line 3032 and that the model-usable features relating only to the specifications of the architecture form a third map line 3033 Here, it may be seen from FIG. 3 that the first map line 3031 is linear but displaced well above the upper range line 3051, that the second map line 3032 tracks closely to the expression 305 proximate to the origin but diverges at a distance from the origin and that the third map line 3033 tracks closely to the expression 305 at a distance from the origin.

With the example provided above, the displacement of the first map line 3031 can be reduced by iterative automatic or operator tuning of the combined model-usable features 303 until the first map line 3031 is brought within the upper and lower range lines 3051 and 3052. At this point, the predictive model 306 can be developed as a piecewise conglomeration of the first map line 3031, the second map line 3032 near the origin and the third map line 3033 at a distance from the origin.

Figure 4:
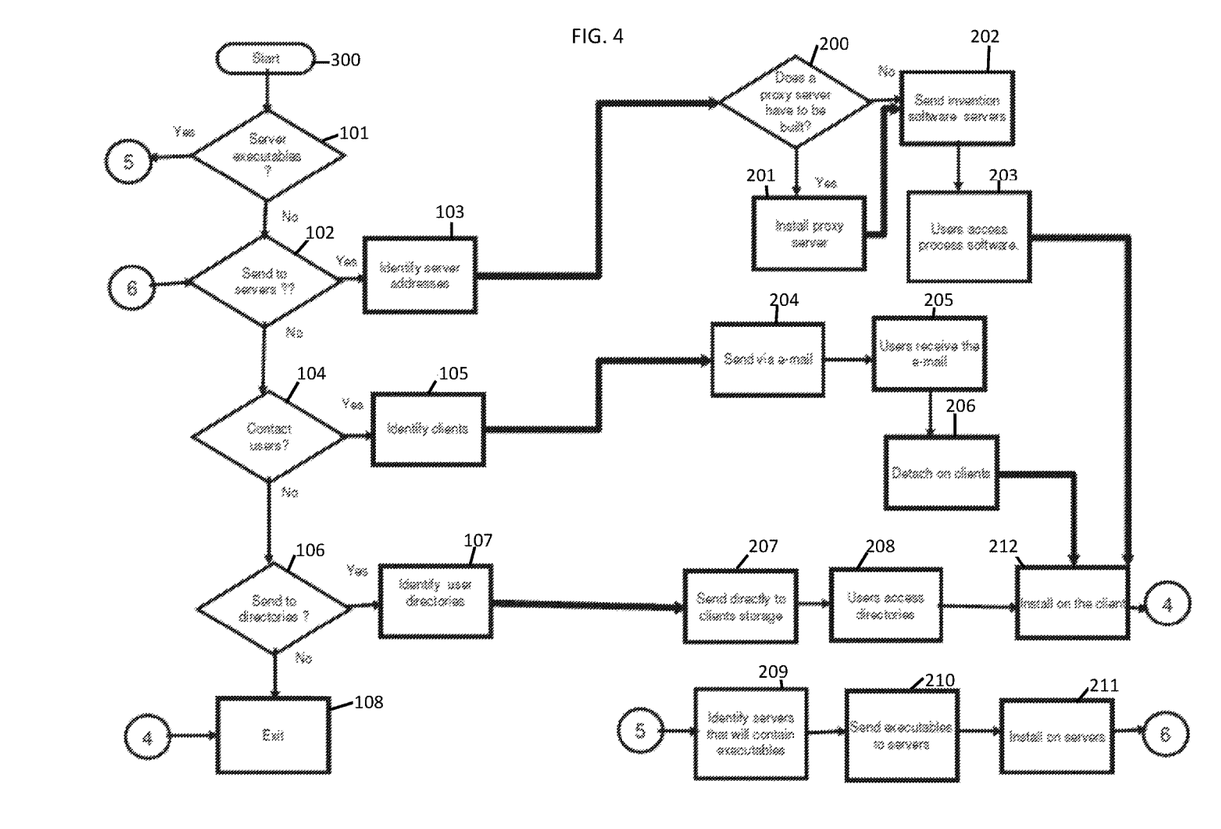
FIG. 4 is a flow diagram illustrating a deployment process of the computer program product of FIGS. 2 and 3.

In accordance with embodiments and, with reference to FIG. 4, a deployment process of the computer program product described above is provided. The process begins at block 300 and at block 101 with a determination of whether the program instructions will reside on server 15 when executed. If so, then the server 15 is identified at block 209. The program instructions are then transferred directly to the server 15 storage via FTP or some other protocol or by copying though the use of a shared file system at block 210 such that the program instructions are installed on the servers at block 211.

Next, a determination is made on whether the program instructions are to be deployed by having users access to the program instructions on server 15 at block 102. If so, the server 15 addresses that will store the program instructions are identified at block 103 and a determination is made if a proxy server is to be built at block 200 for storage. A proxy server is a server that sits between a client application, such as a Web browser, of first computing device 11 and server 15 and operates by intercepting all requests to the server 15 to see if it can fulfill the requests itself. If not, the proxy server forwards the request to server 15. The two primary benefits of a proxy server are to improve performance and to filter requests.

If a proxy server is required, then the proxy server is installed at block 201 and the program instructions are sent via a protocol, such as FTP, or by being copied directly from the source files to the server 15 files via file sharing at block 202. Another embodiment involves sending a transaction to the (one or more) server 15 that contained the process software, and have the server 15 process the transaction and then receive and copy the process software to the server 15 file system. Once the process software is stored, the users may then access the program instructions and copy to the same to their respective client computer file systems at block 203. Alternatively, the server 15 may automatically copy the program instructions to each client and then run an installation program for the program instructions on each client computer whereby the user executes the program that installs the program instructions on his client computer at block 212 and then exits the process at block 108.

At block 104, a determination is made as to whether the program instructions are to be deployed by being sent to users via e-mail. If a result of the determination is affirmative, the set of users are identified together with the addresses of the user client computers at block 105 and the program instructions are sent via e-mail to each of the users' client computers, as shown at block 204. The users then receive the e-mail at block 205 and detach the program instructions from the e-mail to a directory on their client computers at block 206. The user executes the program that installs the program instructions on his client computer at block 212 and then exits the process at block 108.

Lastly, a determination is made on whether the program instructions will be sent directly to user directories on their client computers at block 106. If so, the user directories are identified at block 107 and the process software is transferred directly to the user's client computer directories at block 207. This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the program instructions at block 208, execute the program that installs the program instructions at block 212 and then exit the process at block 108.

Figure 5:
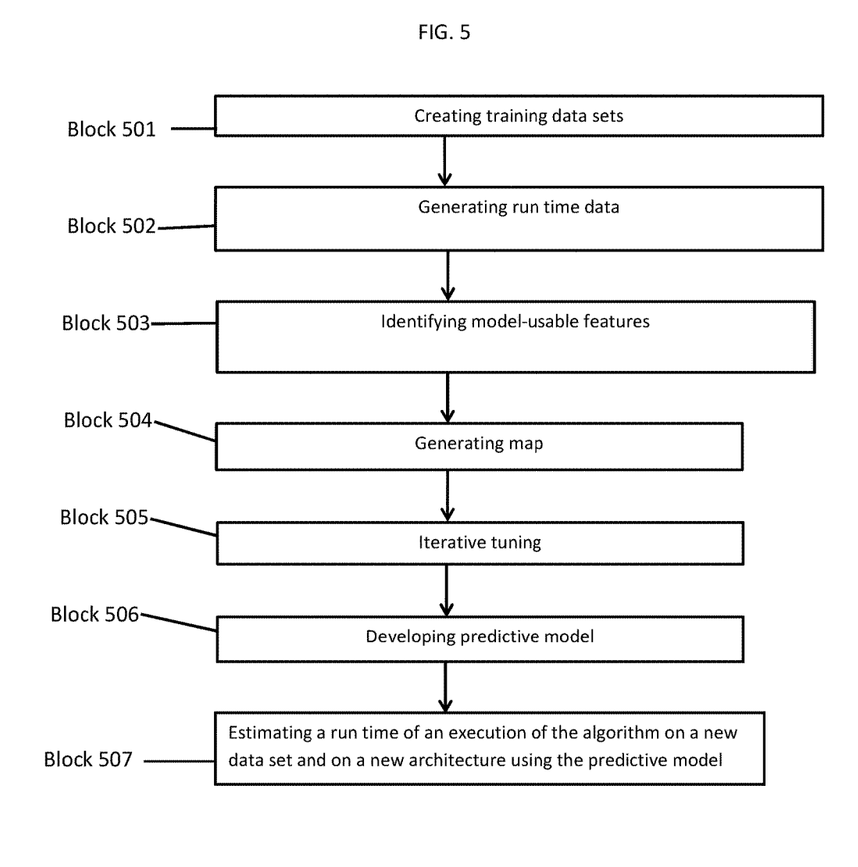
FIG. 5 is a flow diagram illustrating a computer-implemented method for estimating algorithm run times given parameters of the algorithm, specifications of an architecture on which the algorithm will execute and dimensions of a data set which will be input into the algorithm.

With reference to FIG. 5, a computer-implemented method is provided for estimating algorithm run times given parameters of the algorithm, specifications of an architecture on which the algorithm will execute and dimensions of a data set which will be input into the algorithm. The computer-implemented method includes creating training data sets (at block 501), generating run time data associated with respective executions of parameterized instances of the algorithm on the architecture for each of the training data sets (at block 502), identifying model-usable features from factorized polynomial expansions of the dimensions of the data set, the parameters of the algorithm and the specifications of the architecture (at block 503), generating a map of the model-usable features to an expression of the run time data (at block 504), iteratively tuning the model-usable features toward improving an accuracy of the map until a target accuracy is achieved (at block 505), developing a predictive model based on iteratively tuned versions of the model-usable features (at block 506) and estimating a run time of an execution of the algorithm on a new data set and on a new architecture using the predictive model (at block 507).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for estimating algorithm run times given parameters of the algorithm, specifications of an architecture on which the algorithm will execute and dimensions of a data set which will be input into the algorithm, the computer program product comprising a tangible computer readable storage medium having program instructions embodied therewith, the program instructions being readable and executable by a processing circuit to cause the processing circuit to:

deploy the program instructions onto the architecture by at least one of direct transfer of the program instructions to a user accessible server or a proxy server of the architecture, email transfer of the program instructions to users of the architecture and transfer of the program instructions to client computers of the architecture;

deploy the algorithm for execution on the architecture;

create training data sets derived from the execution of the algorithm on the architecture;

generate run time data associated with respective executions of parameterized instances of the algorithm on the architecture for each of the training data sets;

identify model-usable features from polynomial expansions of the dimensions of the data set, the parameters of the algorithm and the specifications of the architecture reduced to simpler terms, wherein the specifications of the architecture comprise disk throughput data, central processing unit (CPU) frequency data, an inversion of available random access memory data and memory bandwidth data;

generate a piecewise map of some or all of the model-usable features to output an expression of the run time data as a conglomeration of multiple map lines in corresponding ones of multiple map regions, respectively, the multiple map regions being respectively defined along a single axis of the piecewise map;

iteratively tune the some or all of the model-usable features in each of the multiple map regions toward improving an accuracy of each of the multiple map lines of the piecewise map relative to target upper and lower range lines until a target accuracy in each of the multiple map regions is achieved;

develop a predictive model based on iteratively tuned versions of the model-usable features in the multiple map regions;

estimate run times of executions of the algorithm on a new data set and on a new architecture using the predictive model; and initiate or delay the executions based on computing resources of the new architecture being available for the estimated run times of the executions and execution priorities.

2. The computer program product according to claim 1, wherein the training data sets are arranged in M rows by N columns.

3. The computer program product according to claim 1, wherein the parameterized instances of the algorithm are generated from one or more variables.

4. The computer program product according to claim 1, wherein the model-usable features are automatically or manually tunable.

5. The computer program product according to claim 1, wherein the expression of the run time data is calculated from regression analysis of the run time data.

6. The computer program product according to claim 1, wherein the target accuracy is predefined as a range of target accuracies.

7. A computing system for estimating algorithm run times given parameters of the algorithm, specifications of an architecture on which the algorithm will execute and dimensions of a data set which will be input into the algorithm, the computing system comprising a tangible computer readable storage medium having instructions stored thereon that are executable by a processing circuit to cause the processing circuit to:

deploy the instructions onto the architecture by at least one of direct transfer of the instructions to a user accessible server or a proxy server of the architecture, email transfer of the instructions to users of the architecture and transfer of the instructions to client computers of the architecture;

deploy the algorithm for execution on the architecture;

create training data sets derived from the execution of the algorithm on the architecture;

generate run time data associated with respective executions of parameterized instances of the algorithm on the architecture for each of the training data sets;

identify model-usable features from polynomial expansions of the dimensions of the data set, the parameters of the algorithm and the specifications of the architecture reduced to simpler terms, wherein the specifications of the architecture comprise disk throughput data, central processing unit (CPU) frequency data, an inversion of available random access memory data and memory bandwidth data;

generate a piecewise map of some or all of the model-usable features to output an expression of the run time data as a conglomeration of multiple map lines in corresponding ones of multiple map regions, respectively, the multiple map regions being respectively defined along a single axis of the piecewise map;

iteratively tune the some or all of the model-usable features in each of the multiple map regions toward improving an accuracy of each of the multiple map lines of the piecewise map relative to target upper and lower range lines until a target accuracy in each of the multiple map regions is achieved;

develop a predictive model based on iteratively tuned versions of the model-usable features in the multiple map regions;

estimate run times of executions of the algorithm on a new data set and on a new architecture using the predictive model; and initiate or delay the executions based on computing resources of the new architecture being available for the estimated run times of the executions and execution priorities.

8. The computing system according to claim 7, wherein the training data sets are arranged in M rows by N columns.

9. The computing system according to claim 7, wherein the parameterized instances of the algorithm are generated from one or more variables.

10. The computing system according to claim 7, wherein the model-usable features are automatically or manually tunable.

11. The computing system according to claim 7, wherein the expression of the run time data is calculated from regression analysis of the run time data.

12. The computing system according to claim 7, wherein the target accuracy is predefined as a range of target accuracies.

13. A computer-implemented method for estimating algorithm run times given parameters of the algorithm, specifications of an architecture on which the algorithm will execute and dimensions of a data set which will be input into the algorithm, the computer-implemented method comprising:

deploying program instructions for executing the computer-implemented method onto the architecture by at least one of direct transfer of the program instructions to a user accessible server or a proxy server of the architecture, email transfer of the program instructions to users of the architecture and transfer of the program instructions to client computers of the architecture;

deploying the algorithm for execution on the architecture;

creating training data sets derived from the execution of the algorithm on the architecture;

generating run time data associated with respective executions of parameterized instances of the algorithm on the architecture for each of the training data sets;

identifying model-usable features from polynomial expansions of the dimensions of the data set, the parameters of the algorithm and the specifications of the architecture reduced to simpler terms, wherein the specifications of the architecture comprise disk throughput data, central processing unit (CPU) frequency data, an inversion of available random access memory data and memory bandwidth data;

generating a piecewise map of some or all of the model-usable features to output an expression of the run time data as a conglomeration of multiple map lines in corresponding ones of multiple map regions, respectively, the multiple map regions being respectively defined along a single axis of the piecewise map;

iteratively tuning the some or all of the model-usable features in each of the multiple map regions toward improving an accuracy of each of the multiple map lines of the piecewise map relative to target upper and lower range lines until a target accuracy in each of the multiple map regions is achieved;

developing a predictive model based on iteratively tuned versions of the model-usable features in the multiple map regions;

estimating run times of executions of the algorithm on a new data set and on a new architecture using the predictive model; and initiating or delaying the executions based on computing resources of the new architecture being available for the estimated run times of the executions and execution priorities.

14. The computer-implemented method according to claim 13, wherein the training data sets are arranged in M rows by N columns.

15. The computer-implemented method according to claim 13, wherein the parameterized instances of the algorithm are generated from one or more variables.

16. The computer-implemented method according to claim 13, wherein the model-usable features are automatically or manually tunable.

17. The computer-implemented method according to claim 13, wherein the target accuracy is predefined as a range of target accuracies.

* * * * *